(12) United States Patent
Kameda et al.

(10) Patent No.: US 8,049,988 B2
(45) Date of Patent: Nov. 1, 2011

(54) PERPENDICULAR MAGNETIC RECORDING HEAD THAT SUPPRESSES SIDE FRINGING

(75) Inventors: Hiroshi Kameda, Tokyo (JP); Kiyoshi Kobayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 646 days.

(21) Appl. No.: 12/112,552

(22) Filed: Apr. 30, 2008

(65) Prior Publication Data

US 2008/0278853 A1   Nov. 13, 2008

(30) Foreign Application Priority Data

May 8, 2007   (JP) ................................ P2007-123326

(51) Int. Cl.
*G11B 5/31* (2006.01)
*G11B 5/11* (2006.01)
*G11B 5/23* (2006.01)

(52) U.S. Cl. ................................ 360/119.04; 360/125.3
(58) Field of Classification Search ............... 360/125.3, 360/125.71, 123.12, 123.37, 123.58, 119.04, 360/119.02
See application file for complete search history.

(56) References Cited

U.S. PATENT DOCUMENTS

| | | | |
|---|---|---|---|
| 7,573,683 B1 * | 8/2009 | Benakli et al. ................. | 360/319 |
| 2005/0068678 A1 * | 3/2005 | Hsu et al. ...................... | 360/126 |
| 2005/0141137 A1 * | 6/2005 | Okada et al. ................... | 360/122 |
| 2007/0268626 A1 * | 11/2007 | Taguchi et al. ................ | 360/126 |
| 2008/0068747 A1 * | 3/2008 | Sasaki et al. ................... | 360/110 |

FOREIGN PATENT DOCUMENTS

| | | |
|---|---|---|
| JP | A-2004-127480 | 4/2004 |
| JP | A-2005-92929 | 4/2005 |
| JP | A-2005-182987 | 7/2005 |
| JP | A-2005-310363 | 11/2005 |

\* cited by examiner

*Primary Examiner* — Craig A. Renner
(74) *Attorney, Agent, or Firm* — Oliff & Berridge, PLC

(57) ABSTRACT

In a perpendicular magnetic recording head including a main magnetic pole layer and a return yoke layer which are laminated with a magnetic gap layer interposed therebetween on a medium-opposing surface, and a pair of side shield layers positioned on both sides in the track width direction of the main magnetic pole layer while interposing a nonmagnetic material layer therebetween, the magnetic gap layer is formed in a partial area in the track width direction bridging the main magnetic pole layer and the pair of side shield layers. The pair of side shield layers are in contact with the return yoke layer in a remaining area where the magnetic gap layer is absent.

3 Claims, 8 Drawing Sheets

PERPENDICULAR MAGNETIC RECORDING HEAD THAT SUPPRESSES SIDE FRINGING

BACKGROUND OF THE INVENTION

1. Field of the Invention

The present invention relates to a perpendicular magnetic recording head which performs a recording action by applying a recording magnetic field perpendicularly to a recording medium plane.

2. Related Background Art

As is well-known, a perpendicular magnetic recording head includes a main magnetic pole layer and a return yoke layer which have front end faces exposed at a surface opposing a recording medium (medium-opposing surface) and are magnetically coupled to each other on the deeper side of the medium-opposing surface in the height direction, a magnetic gap layer interposed between the main magnetic pole layer and return yoke layer on the medium-opposing surface, and a coil layer inducing a recording magnetic field between the main magnetic pole layer and return yoke layer upon energization. The recording magnetic field induced between the main magnetic pole layer and return yoke layer perpendicularly enters a hard film of the recording medium from the front end face of the main magnetic pole layer and returns to the front end face of the return yoke layer through a soft film of the recording medium. This performs magnetic recording at a part opposing the front end face of the main magnetic pole layer. The size in the track width direction of the front end face of the main magnetic pole layer, i.e., recording track width size, has been becoming narrower as hard disk drives have been attaining higher recording densities.

In a perpendicular magnetic recording head having a narrowed track, how to suppress side fringing at the time of skewing where the head is driven in a state tilted with respect to a recording medium has become a problem. As a method of suppressing side fringing at the time of skewing, it has been known to provide a magnetic shield layer for absorbing magnetic fluxes leaking from sides of the main magnetic pole layer in the vicinity of the main magnetic pole layer so as to enhance the recording magnetic field gradient, Examples of such a magnetic shield layer are described in Japanese Patent Application Laid-Open No. 2005-92929, Japanese Patent Application Laid-Open No. 2005-310363, Japanese Patent Application Laid-Open No. 2005-182987 and Japanese Patent Application Laid-Open No. 2004-127480.

SUMMARY OF THE INVENTION

When a magnetic shield layer is provided such as to surround the upper face and both side faces in the track width direction of the main magnetic pole layer as in Japanese Patent Application Laid-Open No. 2005-92929, Japanese Patent Application Laid-Open No. 2005-310363 and Japanese Patent Application Laid-Open No. 2005-182987, not only the leakage magnetic fluxes from sides of the main magnetic pole layer but also recording magnetic fluxes directed from the main magnetic pole layer to the recording medium are absorbed by the magnetic shield layer, whereby the recording magnetic field applied to the recording medium becomes extremely small. This causes a fear of recording actions failing for recording media having a high coercivity, whereby the total recording performance will deteriorate even if the recording magnetic field gradient improves.

When a pair of magnetic shield layers are provided on both sides in the track width direction of the main magnetic pole layer as in Japanese Patent Application Laid-Open No. 2004-127480, on the other hand, the pair of magnetic shield layers are surrounded by a nonmagnetic material and attain a magnetically independent state, whereby the amount of magnetic fluxes flowing from the main magnetic pole layer into the magnetic shield layer is small. Therefore, a sufficient side fringing suppressing effect cannot be obtained, though the recording magnetic field applied to the recording medium becomes greater.

Thus, it has been difficult for the conventional structures to suppress side fringing while keeping the recording magnetic field intensity from decreasing.

It is an object of the present invention to provide a perpendicular magnetic recording head which can suppress side fringing while keeping the recording magnetic field intensity from decreasing.

The present invention is achieved by taking account of the facts that a side shield effect can be enhanced when providing a pair of side shield layers on both sides in the track width direction of the main magnetic pole layer while interposing a nonmagnetic material therebetween and magnetically connecting the pair of side shield layers to the return yoke layer, and that the recording magnetic field intensity can be kept from decreasing if the pair of side shield layers are locally magnetically separated from the return yoke layer.

Namely, the present invention is a perpendicular magnetic recording head comprising a main magnetic pole layer and a return yoke layer which are laminated with a predetermined distance therebetween on a surface opposing a recording medium and magnetically coupled to each other on the deeper side of the medium-opposing surface in a height direction, a magnetic gap layer interposed between the main magnetic pole layer and the return yoke layer on the medium-opposing surface side, and a pair of side shield layers positioned on both sides in a track width direction of the main magnetic pole layer while interposing a nonmagnetic material layer therebetween; wherein the magnetic gap layer is formed in a partial area in the track width direction bridging the main magnetic pole layer and the pair of side shield layers, the pair of side shield layers being in contact with the return yoke layer in a remaining area where the magnetic gap layer is absent.

In this structure, the pair of side shield layers are separated from the return yoke layer by the magnetic gap layer in the vicinity of the trailing edge of the main magnetic pole layer, so that the magnetic path length from the trailing edge of the main magnetic pole layer to the pair of side shield layers becomes longer than that in the case where the pair of side shield layers are not separated from the return yoke layer, whereby recording magnetic fluxes are harder to be absorbed by the pair of side shield layers. This can keep the recording magnetic field intensity from decreasing. Except for the vicinity of the trailing edge of the main magnetic pole layer, no magnetic gap layer exists, so that the pair of side shield layers are in direct contact with the return yoke layer and function as a magnetic layer integrated with the return yoke layer. Therefore, side magnetic fluxes leaking from the main magnetic pole layer are easier to be absorbed by the pair of side shield layers than in the case where the pair of side shield layers are completely separated from the return yoke layer, whereby side fringing can be suppressed. The difficulty for the pair of side shield layers to absorb recording magnetic fluxes can be adjusted by the size of the magnetic gap layer in the track width direction.

Specifically, it will be preferred if the pair of side shield layers have a flat surface constituting the same plane with the trailing edge of the main magnetic pole layer and are in contact with the return yoke layer in an area of the flat surface where the magnetic gap layer is absent. It will also be preferred if the pair of side shield layers have a flat surface constituting the same plane with the trailing edge of the main magnetic pole layer, the flat surface being laminated with the magnetic gap layers, and end faces in the track width direction respectively continuous with both side faces in the track width direction of the magnetic gap layer, the pair of side shield layers being in contact with the return yoke layer at both of the end faces in the track width direction.

In the present invention, the pair of side shield layers are separated from the return yoke layer by the magnetic gap layer in the vicinity of the main magnetic pole layer, so that recording magnetic fluxes directed from the main magnetic pole layer to the recording medium are hard to be absorbed by the pair of side shield layers, whereby the recording magnetic field intensity can be kept from decreasing. At the same time, the pair of side shield layers are in contact with the return yoke layer in a remaining area in the track width direction where the magnetic gap layer is absent, so that side magnetic fluxes leaking from the main magnetic pole layer are easy to be absorbed by the pair of side shield layers, whereby side fringing can be suppressed. This yields a perpendicular magnetic recording head which can suppress side fringing while keeping the recording magnetic field intensity from decreasing.

The present invention will be more fully understood from the detailed description given here in below and the accompanying drawings which are given by way of illustration only, and thus are not to be considered as limiting the present invention.

Figure 4:
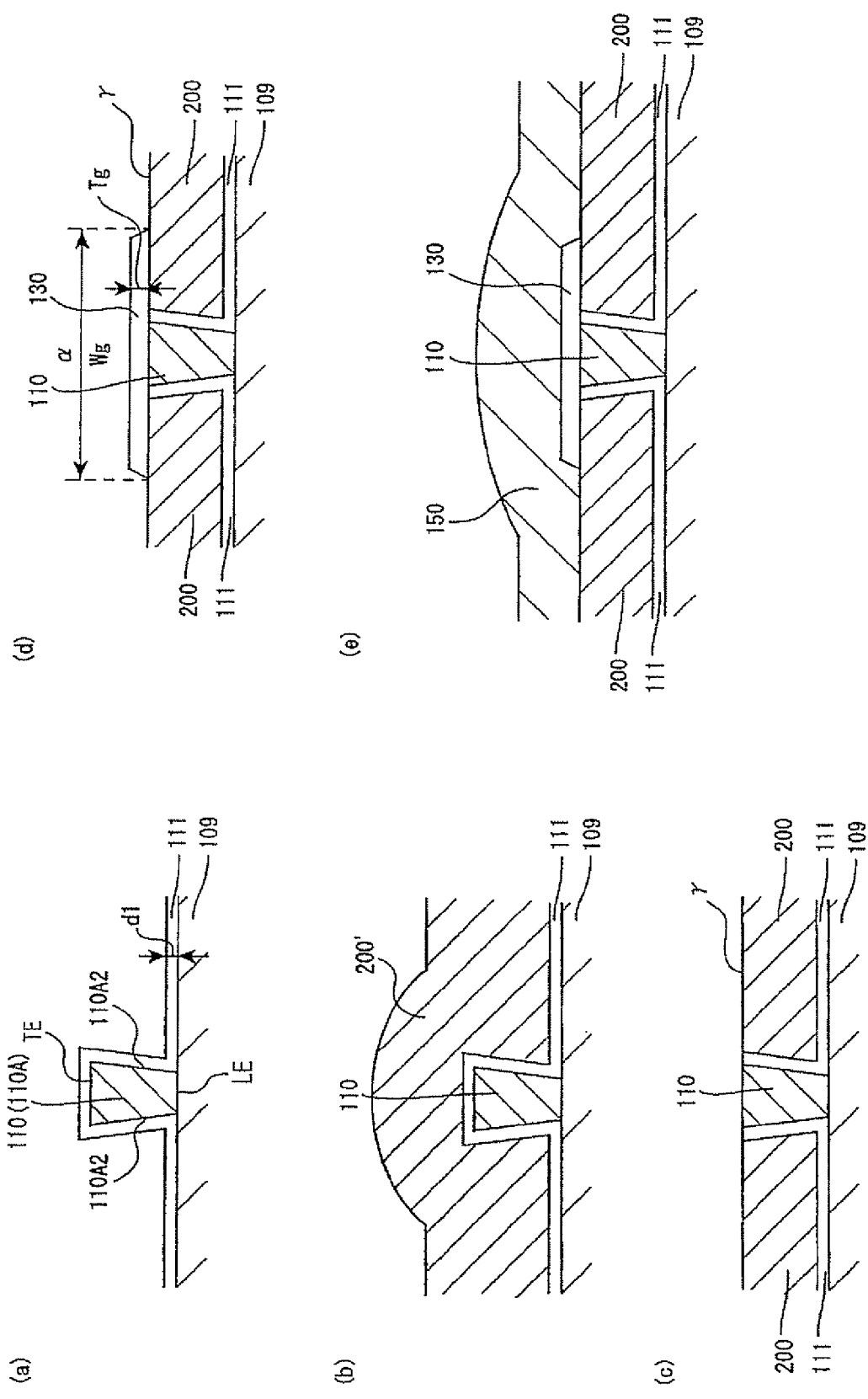
Figure 5:
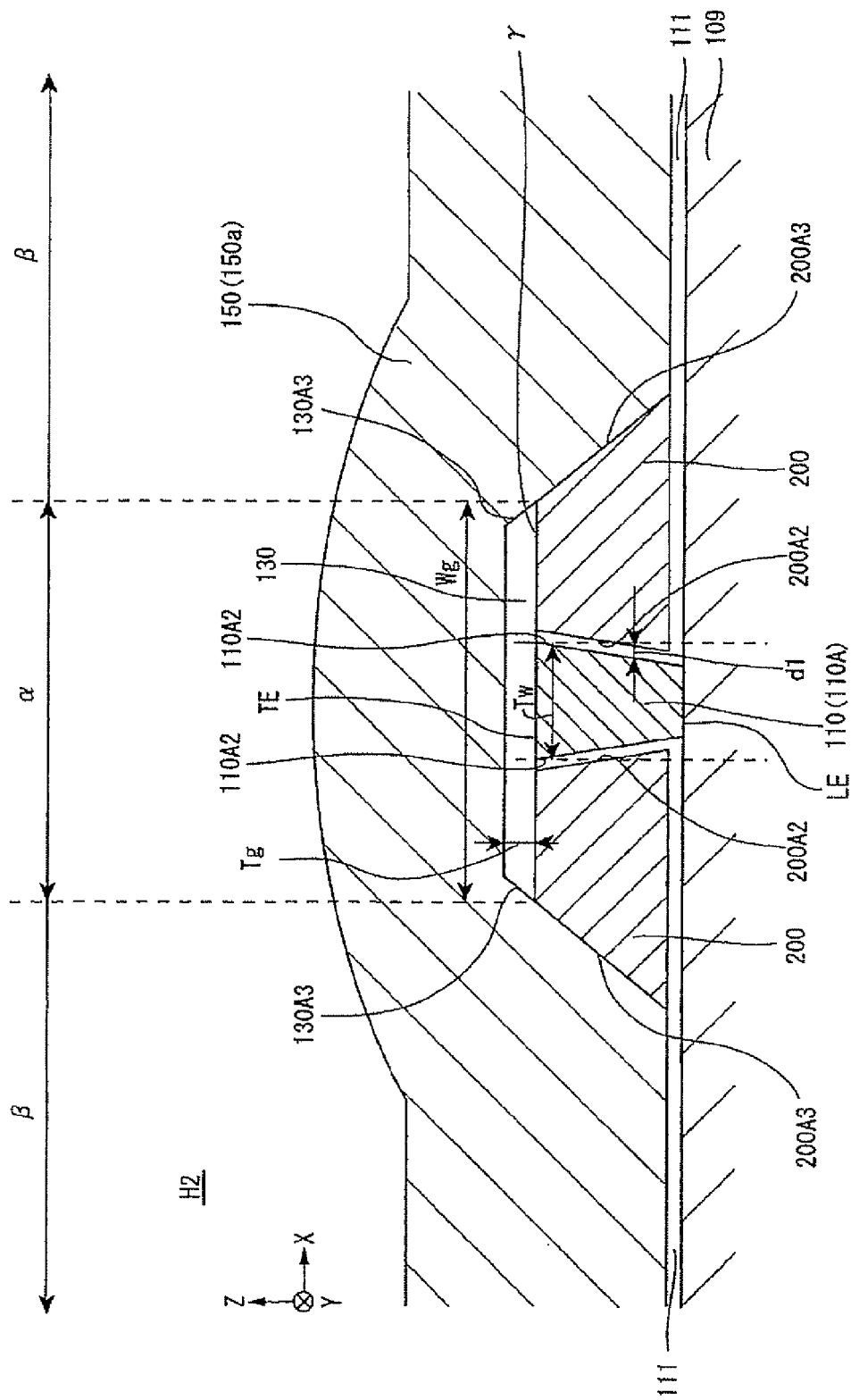
Figure 6:
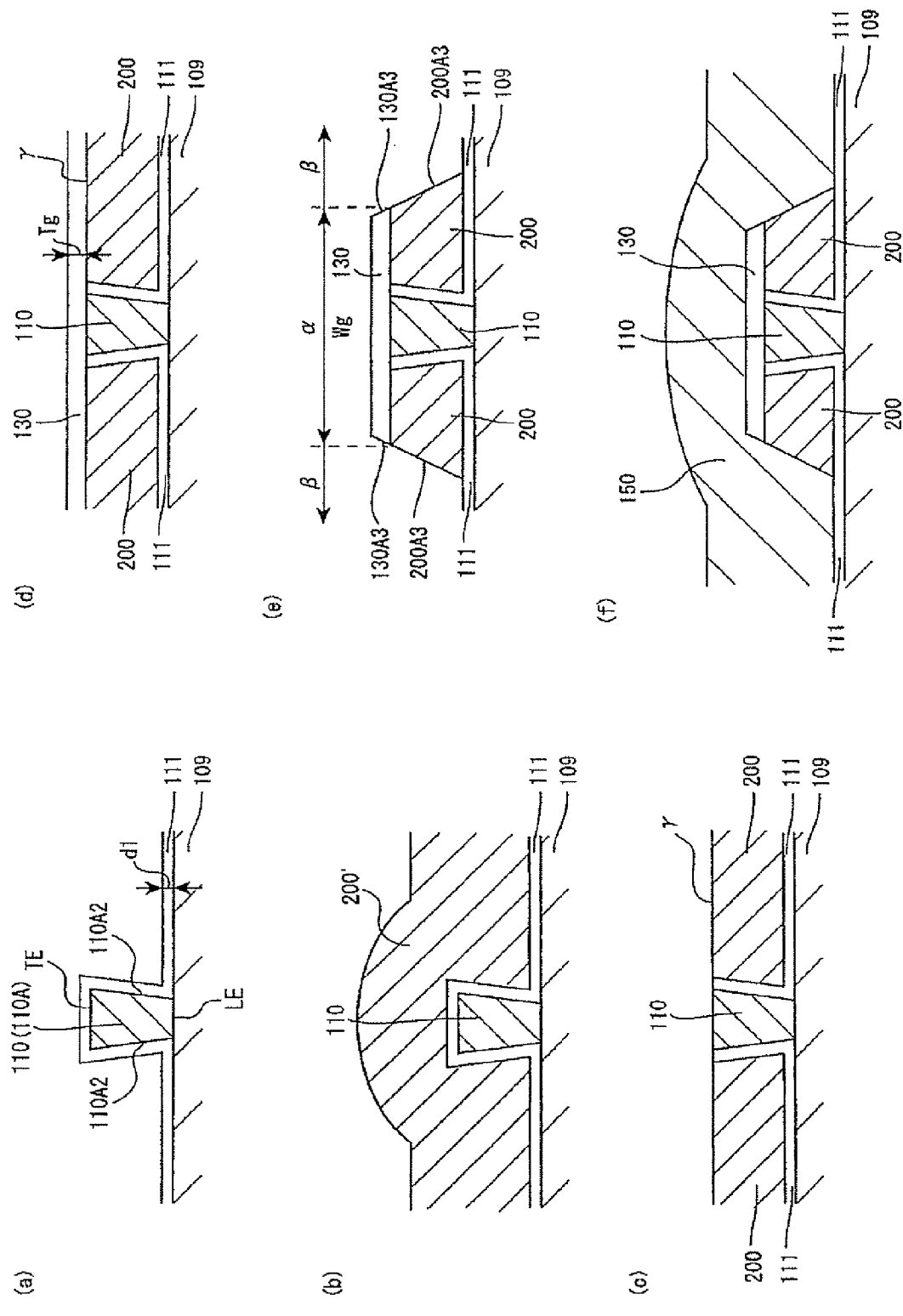
Figure 7:
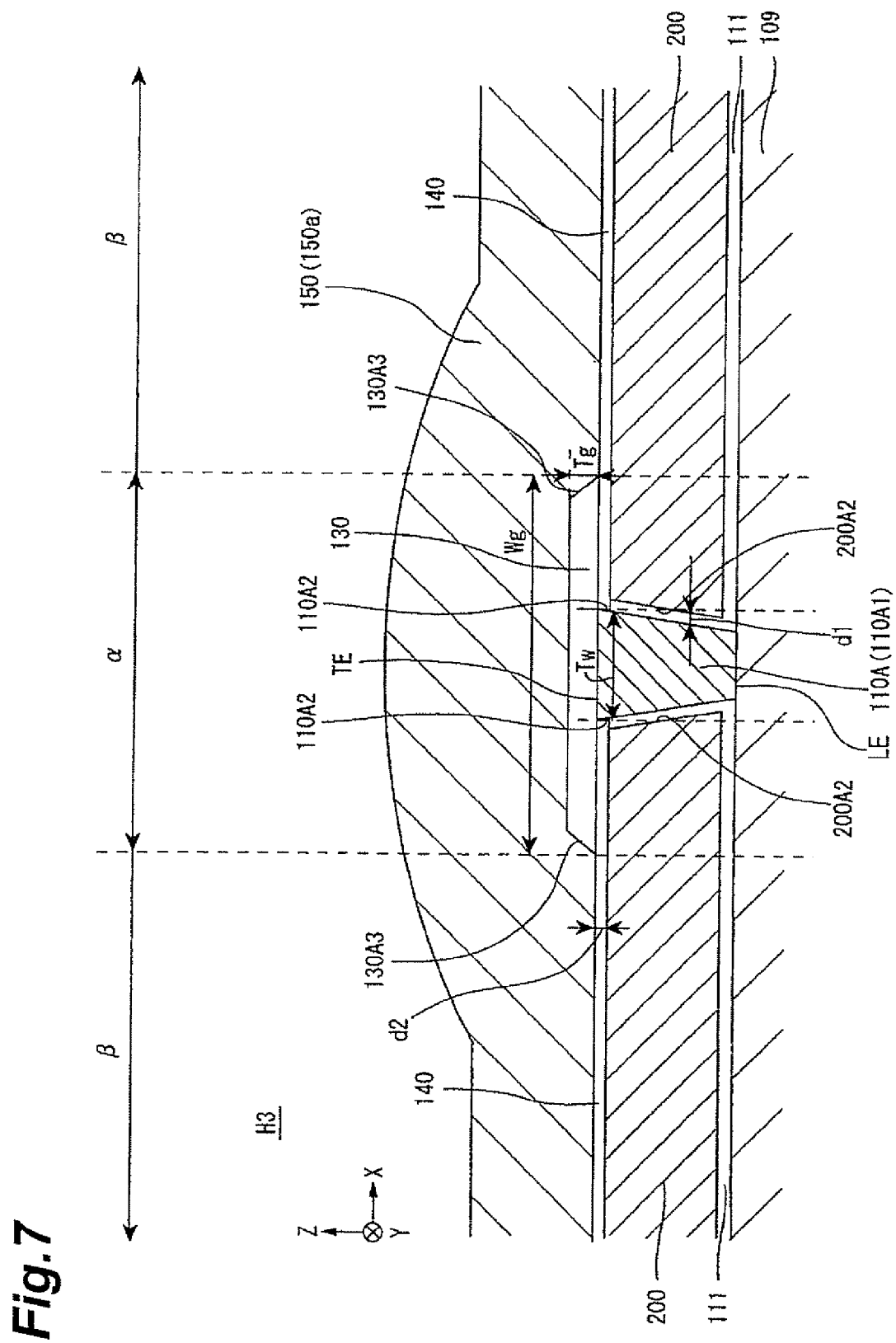
Figure 8:
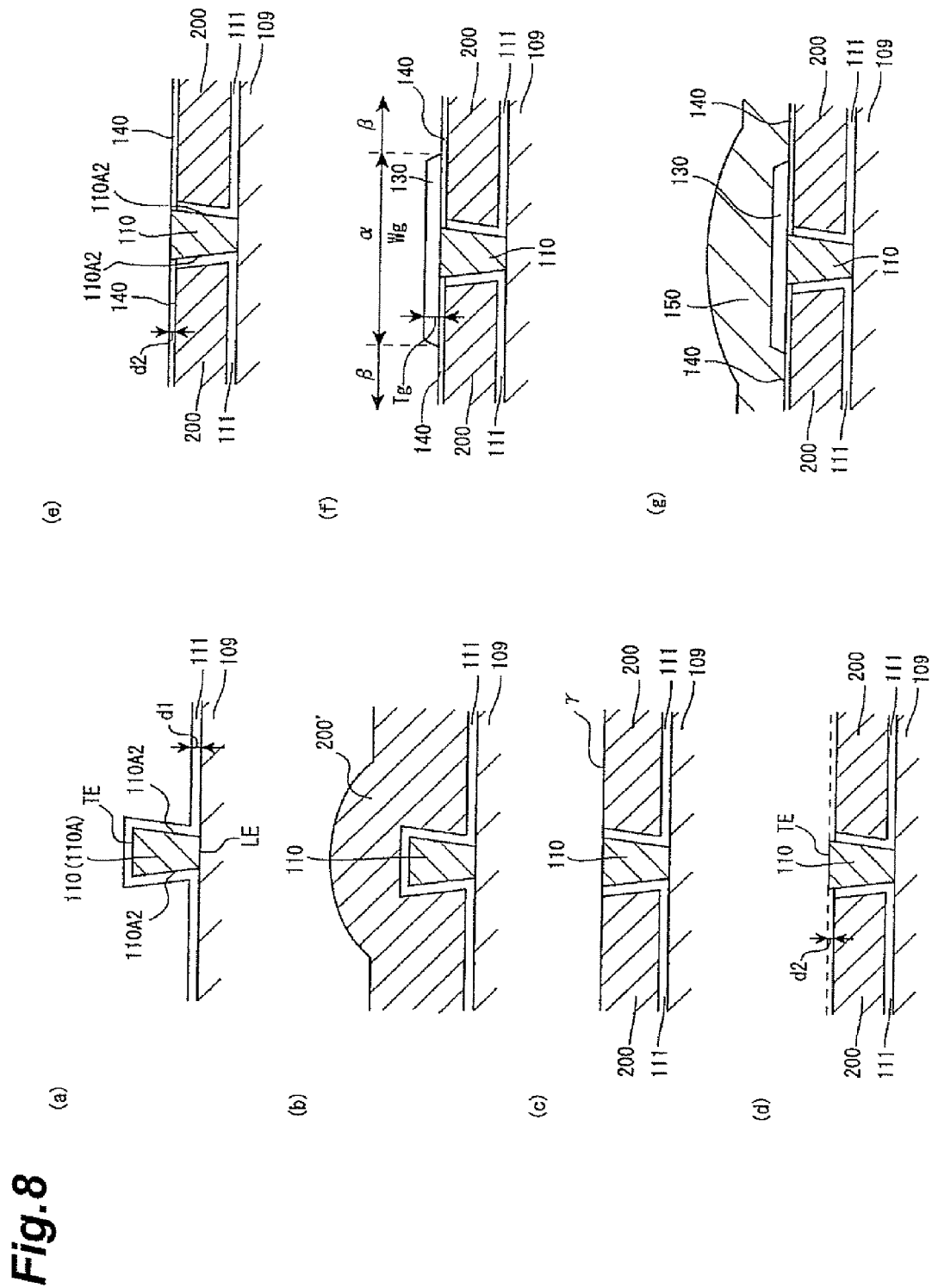

(a) to (e) of FIG. 4 are sectional views for explaining manufacturing steps of the perpendicular magnetic recording head in accordance with the first embodiment;

FIG. 5 is a sectional view showing the multilayer structure of the perpendicular magnetic recording head in accordance with the second embodiment as seen from the medium-opposing surface side;

(a) to (f) of FIG. 6 are sectional views for explaining manufacturing steps of the perpendicular magnetic recording head in accordance with the second embodiment;

FIG. 7 is a sectional view showing the multilayer structure of the perpendicular magnetic recording head in accordance with the third embodiment as seen from the medium-opposing surface side; and (a) to (g) of FIG. 8 are sectional views for explaining manufacturing steps of the perpendicular magnetic recording head in accordance with the third embodiment.

DESCRIPTION OF THE PREFERRED EMBODIMENTS

In the following, the present invention will be explained with reference to the drawings. In each drawing, X, Y, and Z directions are defined by the track width direction, the height direction, and the laminating direction (thickness direction) of layers constituting a perpendicular magnetic recording head, respectively.

Figure 1:
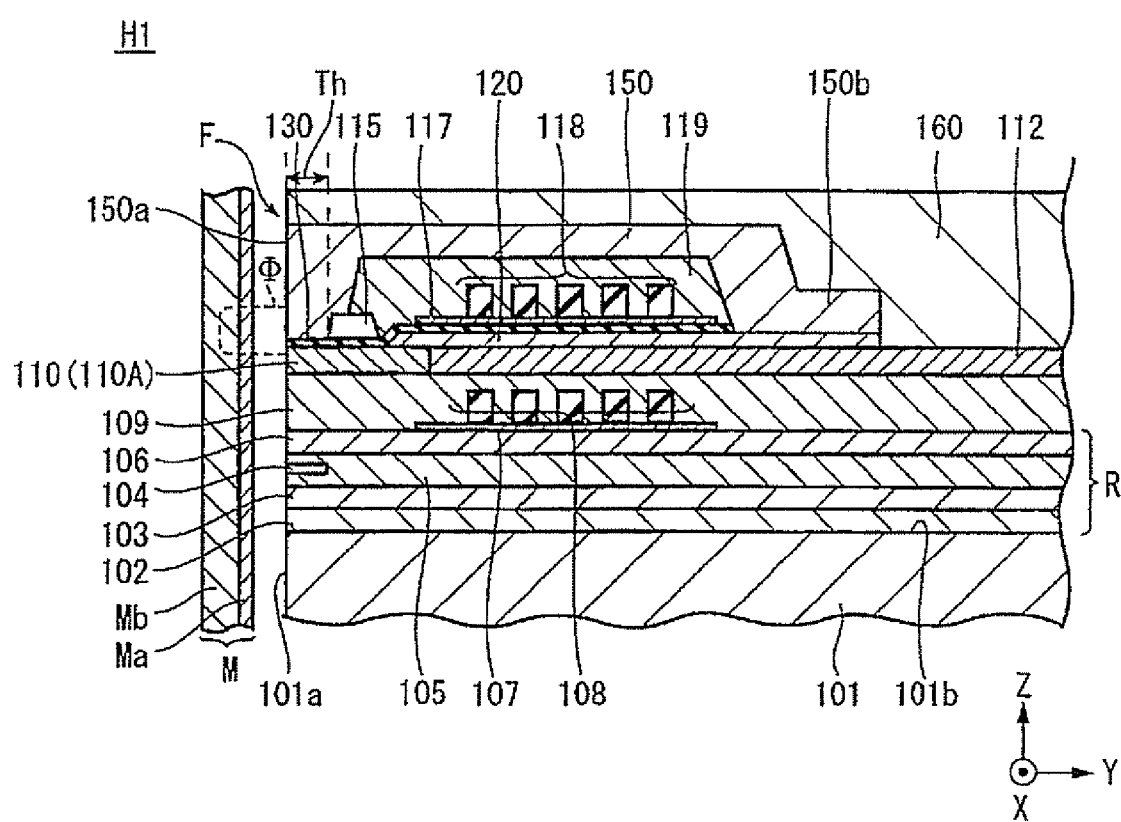
FIG. 1 is a sectional view showing the multilayer structure of the perpendicular magnetic recording head in accordance with the first embodiment of the present invention.
Figure 2:
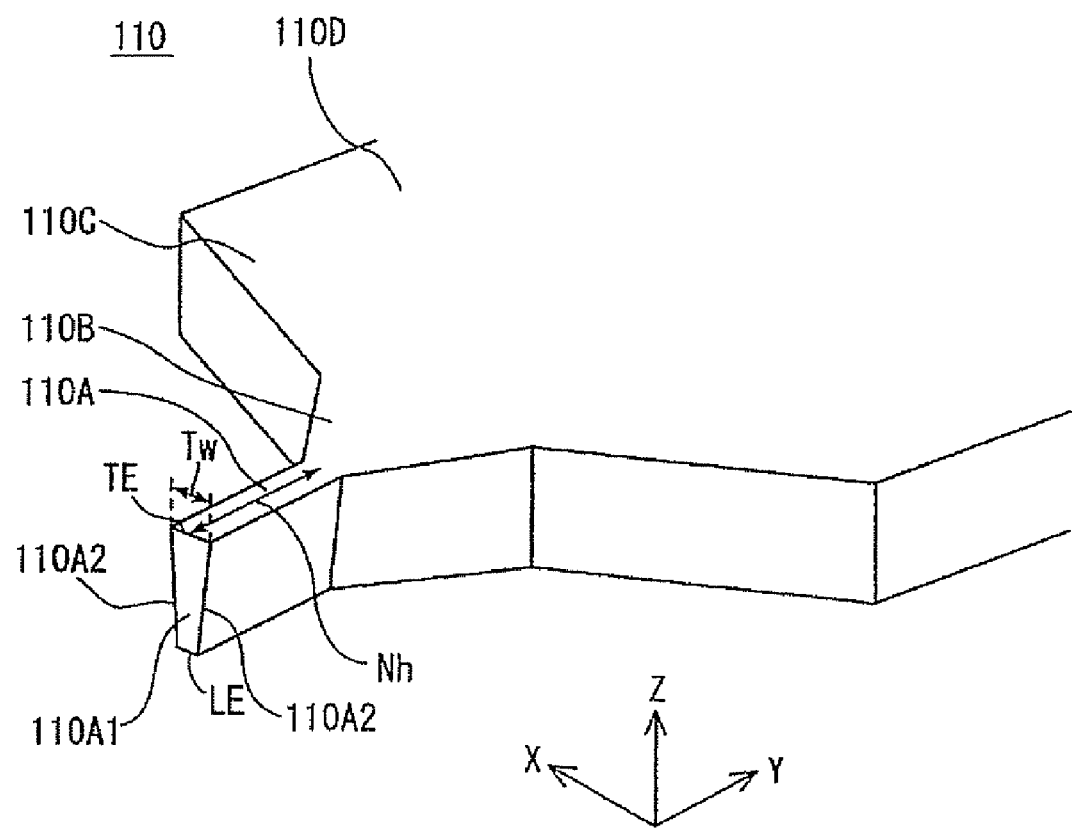
FIG. 2 is a perspective view for explaining the main magnetic pole form.

FIG. 1 is a vertical sectional view showing the multilayer structure of the perpendicular magnetic recording head H1 in accordance with a first embodiment of the present invention, while FIG. 2 is a perspective view for explaining a main magnetic pole form.

The perpendicular magnetic recording head H1 provides a recording medium M with a recording magnetic flux Φ perpendicular thereto, thereby perpendicularly magnetizing a hard film Ma of the recording medium M. The recording medium M has the hard film Ma with a higher remanent magnetization on the medium surface side and a soft film Mb with a higher magnetic permeability on the inner side of the hard film Ma. The recording medium M is shaped like a disk, for example, and is rotated about the center of the disk as a rotary axis. A slider 101 is formed by a nonmagnetic material such as $Al_2O_3 \cdot TiC$. The slider 101 has a medium-opposing surface 101a opposing the recording medium M. As the recording medium M rotates, a surface airflow levitates the slider 101 from the surface of the recording medium M.

The trailing-side end face 101b of the slider 101 is formed with a nonmagnetic insulating layer 102 made of an inorganic material such as $Al_2O_3$ or $SiO_2$, while a reading part R is formed on the nonmagnetic insulating layer 102. The reading part R has a lower shield layer 103, an upper shield layer 106, an inorganic insulating layer (gap insulating layer) 105 filling the gap between the lower and upper shield layers 103, 106, and a reading device 104 positioned within the inorganic insulating layer 105. The reading device 104 is a magnetoresistive device such as AMR, GMR, or TMR.

By way of a coil insulating foundation layer 107, a first coil layer 108 constituted by a plurality of lines made of a conductive material is formed on the upper shield layer 106. The first coil layer 108 is made of at least one nonmagnetic metal material selected from Au, Ag, Pt, Cu, Cr, Al, Ti, NiP, Mo, Pd, and Rh, for example. It may have a multilayer structure in which such nonmagnetic metal materials are laminated. A coil insulating layer 109 made of $Al_2O_3$, $SiO_2$, or the like is formed about the first coil layer 108.

The upper face of the coil insulating layer 109 is made flat. An undepicted plating foundation layer is formed on the flat surface, while a main magnetic pole layer 110 made of a ferromagnetic material having a high saturated magnetic flux density such as Ni—Fe, Co—Fe, or Ni—Fe—Co is formed on the plating foundation layer.

As shown in FIG. 2, the main magnetic pole layer 110 has a magnetic pole part (pole straight part) 110A, a $1^{st}$ flare part 110B, a $2^{nd}$ flare part 110C, and a base part 110D successively from the medium-opposing surface F side. The magnetic pole part 110A has a front end face 110A1 exposed at the medium-opposing surface F. Its size in the track width direction at the trailing edge TE is defined by a recording track width Tw, while its size in the height direction is defined by a predetermined neck height Nh. The magnetic pole part 110A uniformly exhibits a trapezoidal (bevel) form which is narrower on the leading edge LE side than on the trailing edge TE side throughout its length when seen from the medium-opposing surface F. Beveling the magnetic pole part 110A can reduce side magnetic fluxes (leakage magnetic fields) reaching from the leading edge LE side to the recording medium M. The $1^{st}$ flare part 110B is an area for narrowing the recording magnetic field from the base part 110D to the magnetic pole part 110A and expands the size in the track width direction from the magnetic pole part 110A to the deeper side in the height direction. The $2^{nd}$ flare part 110C is an area for adjusting a domain structure generated in the base part 110D after excitation such that it is oriented in the track width direction, and joins the $1^{st}$ flare part 110B and the base part 110D to each other. The main magnetic pole layer 110 of this embodiment is not formed on the whole coil insulating layer 109 but locally on only the medium-opposing surface F side thereof, and is magnetically connected to an auxiliary yoke layer 120 at the base part 110D. The auxiliary yoke layer 120 is made of a magnetic material having a saturated magnetic flux density lower than that of the main magnetic pole layer 110 and transmits magnetic fluxes of the recording magnetic field induced by the recording coil (first and second coil layers 108, 118) to the main magnetic pole layer 110. A second nonmagnetic material layer 112 is formed on the deeper side in the height direction of the main magnetic pole layer 110 and made flat such that the upper face of the main magnetic pole layer 110 is flush with the upper face of the second nonmagnetic material layer 112. The second nonmagnetic material layer 112 is made of a nonmagnetic material such as $Al_2O_3$ or $SiO_2$, for example.

A magnetic gap layer 130 made of an inorganic nonmagnetic insulating material such as $Al_2O_3$ or $SiO_2$, for example, is formed on the main magnetic pole layer 110. On the magnetic gap layer 130, a height determining layer 115 is formed at a position retracted from the medium-opposing surface F by a predetermined throat height Th to the deeper side in the height direction, while the second coil layer 118 is formed on the deeper side of the height determining layer 115 in the height direction by way of a coil insulating foundation layer 117.

As with the first coil layer 108, the second coil layer 118 is formed by a plurality of lines made of a conductive material. For example, the second coil layer 118 is made of at least one nonmagnetic metal material selected from Au, Ag, Pt, Cu, Cr, Al, Ti, NiP, Mo, Pd, and Rh. It may have a multilayer structure in which such nonmagnetic metal materials are laminated. The first and second coil layers 108, 118 are electrically connected to each other at their end parts in the track width direction (depicted X direction) so as to become toroidal. The form of coil layers (magnetic field generating means) is not limited to the toroidal form, though. A coil insulating layer 119 is formed about the second coil layer 118.

A return yoke layer 150 made of a ferromagnetic material having a high saturated magnetic flux density such as Ni—Fe, Co—Fe, or Ni—Fe—Co is formed such as to extend over the coil insulating layer 119, height determining layer 115, and magnetic gap layer 130. The return yoke layer 150 has a front end face 150a, which is exposed at the medium-opposing surface F and opposes the magnetic pole part 110A of the main magnetic pole layer 110 while interposing the magnetic gap layer 130 therebetween, and a connecting part 150b magnetically connecting with the base part 110D of the main magnetic pole layer 110 through the auxiliary yoke layer 120 on the deeper side in the height direction. The return yoke layer 150 is covered with a protecting layer 160 made of an inorganic nonmagnetic insulating material.

Figure 3:
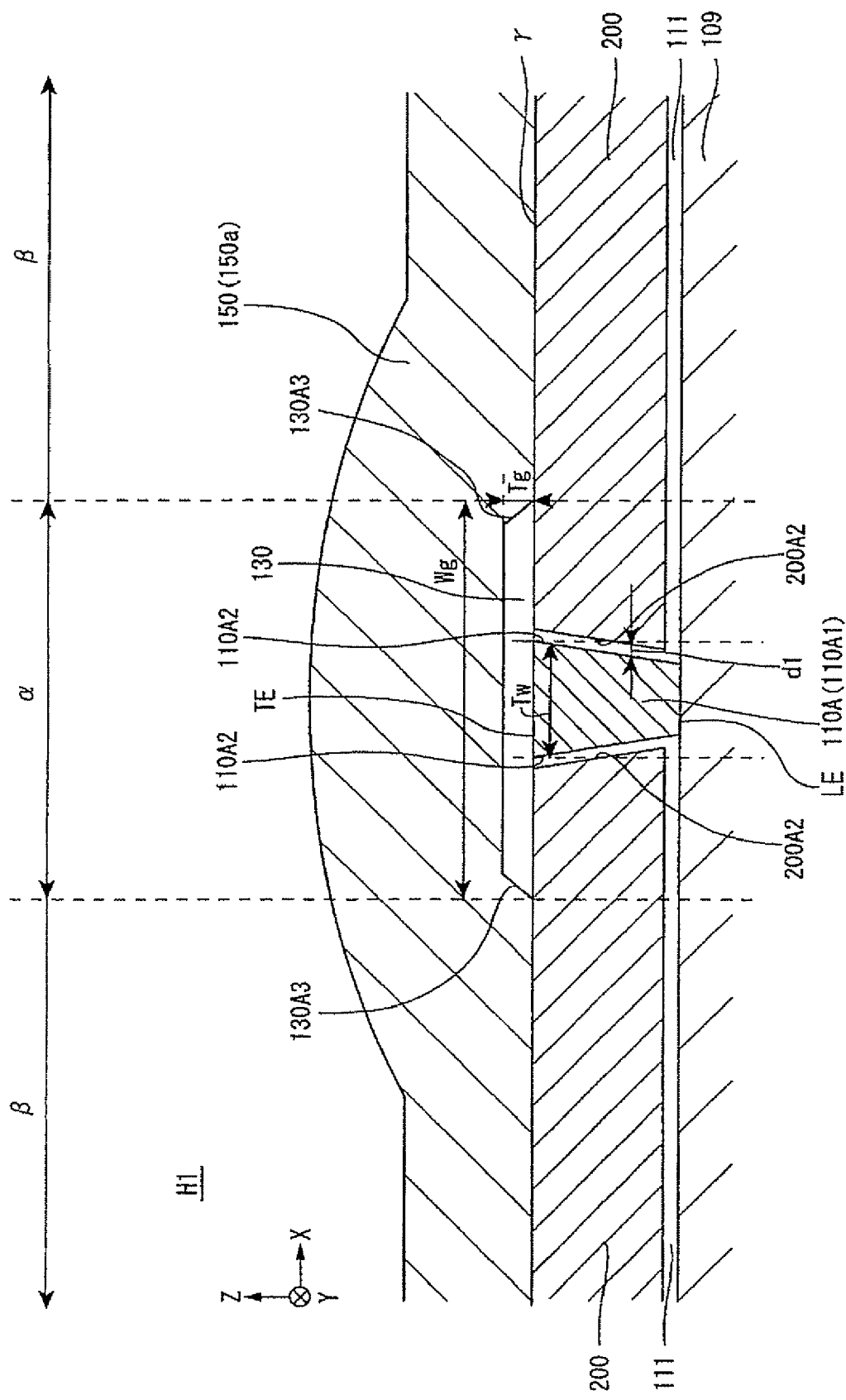
FIG. 3 is a sectional view showing the multilayer structure of the perpendicular magnetic recording head in accordance with the first embodiment as seen from the medium-opposing surface side.

FIG. 3 is a transverse sectional view showing the multilayer structure of the perpendicular magnetic recording head H1 as seen from the surface opposing the recording medium.

As shown in FIG. 3, a pair of side shield layers 200 are positioned on both sides in the track width direction of the main magnetic pole layer 110 while interposing a first nonmagnetic material layer 111 therebetween. The pair of side shield layers 200 are formed on the coil insulating layer 109 while interposing the first nonmagnetic material layer 111 therebetween, so as to be symmetrical about the center position in the track width direction of the magnetic pole part 110A of the main magnetic pole layer 110. The pair of side shield layers 200 are made of a soft magnetic material such as Ni—Fe or NiFeCo, for example, and have a magnetic shield function for absorbing side magnetic fluxes leaking from both side faces 1101A2 in the track width direction of the magnetic pole part 110A of the main magnetic pole layer 110. The first nonmagnetic material layer 111 is made of a nonmagnetic material such as $Al_2O_3$ or $SiO_2$, for example.

The pair of side shield layers 200 have end faces 200A opposing both side faces 110A2 in the track width direction of the magnetic pole part 110A. The end faces 200A2 form tilted surfaces corresponding to the trapezoidal form of the magnetic pole part 110A and increasing the thickness as they are distanced farther in the track width direction from their corresponding side faces 110A2 of the magnetic pole part 110A, so as to be parallel to the side faces 110A2. The gap between the pair of side shield layers 200 (gap between the end faces 200A2) is defined smaller than the track width Tw on the leading edge LE side of the magnetic pole part 110A so as to be able to absorb more of side magnetic fluxes leaking from the side faces 110A2 of the magnetic pole part 110A. In other words, in the leading edge LE side of the magnetic pole part 110A, each of the end faces 200A2 is positioned in an area from a side-face position in the track width direction at the trailing edge TE of the magnetic pole part 110A to a side-face position in the track width direction at the leading edge LE of the magnetic pole part 110A. Specifically, the gap d1 between the end face 200A2 of each side shield layer 200 and its opposing side face 110A2 of the magnetic pole part 110A is about 30 to 50 nm and corresponds to the (fixed) thickness of the first nonmagnetic material layer 111.

The pair of side shield layers 200 extend in the track width direction by a uniform thickness except for the end faces 200A2. Though not shown in FIG. 3, both end positions of the pair of side shield layers 200 substantially coincide with both end positions in the track width direction of the return yoke layer 150. In the height direction, the pair of side shield layers 200 are formed such as to extend from the magnetic pole part 110A of the main magnetic pole layer 110 to a part of the $1^{st}$ flare part 110B. Together with the upper face (trailing edge TE) of the main magnetic pole layer 110 and the upper face of the first nonmagnetic material layer 111, the upper faces of the pair of side shield layers 200 form a flat surface γ at the same lamination position.

In the perpendicular magnetic recording head H1 having the foregoing overall structure, as shown in FIG. 3, the magnetic gap layer 130 is formed in a partial area α in the track width direction bridging the main magnetic pole layer 110 and the pair of side shield layers 200, whereas the pair of side shield layers 200 are in contact with the return yoke layer 150 in remaining areas β in the track width direction where the magnetic gap layer 130 is absent.

The magnetic gap layer 130, pair of side shield layers 200, and return yoke layer 150, which are characteristic parts of the present invention, will now be explained in detail with reference to FIG. 3.

The magnetic gap layer 130 is one locally provided on the flat surface γ formed by the main magnetic pole layer 110, first nonmagnetic material layer 111, and pair of side shield layers 200, and extends in the track width direction from the upper side of the main magnetic pole layer 110, so as to position their both end faces 130A3 on the pair of side shield layers 200, respectively. Each of the end faces 130A3 is formed by a tilted surface reducing the thickness as it is distanced farther from the main magnetic pole layer 100 so as to come into contact with the return yoke layer 150 without any gap therebetween. The cross-sectional form of the magnetic gap layer 130 as seen from the medium-opposing surface F is a trapezoidal form symmetrical about the center position in the track width direction of the main magnetic pole layer 110. The thickness Tg of the magnetic gap layer 130, which defines a magnetic gap distance for magnetically separating the main magnetic pole layer 110 and the return yoke layer 150 from each other on the medium-opposing surface F, is specifically about 30 to 50 nm. Though the magnetic gap layer 130 is extended to the upper side of the auxiliary yoke layer 120 in the height direction, it will be sufficient if the magnetic gap layer 130 has such a size in the height direction as to be interposed between the main magnetic pole layer 110 and the return yoke layer 150 at least on the medium-opposing surface F side.

The magnetic gap layer 130 forms a nonmagnetic space which separates the main magnetic pole layer 110, pair of side shield layers 200, and return yoke layer 150 from each other in the vicinity of the trailing edge TE of the main magnetic pole layer 110. In other words, the magnetic gap layer 130 physically separates the main magnetic pole layer 110, pair of side shield layers 200, and return yoke layer 150 from each other in the vicinity of the trailing edge TE of the main magnetic pole layer 110. Therefore, the magnetic path length by which recording magnetic fluxes emitted from the trailing edge TE of the main magnetic pole layer 110 reach the pair of side shield layers 200 is longer by the gap width (the size in the track width direction of the magnetic gap layer 130) Wg/2 than that in the case where the pair of side shield layers 200 are not separated from the return yoke layer 150 (the case where the magnetic gap layer 130 is formed only between the main magnetic pole layer 110 and the return yoke layer 150, so that the pair of side shield layers 200 are in contact with the return yoke layer 150 in the whole area in the track width direction). This reduces recording magnetic fluxes absorbed by the pair of side shield layers 200, and thus can keep recording magnetic fluxes directed from the main magnetic pole layer 110 to the recording medium M, i.e., recording magnetic field intensity, from decreasing.

The pair of side shield layers 200 are separated from the return yoke layer 150 by the magnetic gap layer 130 on the side (in the partial area α) opposing the main magnetic pole layer 110 as mentioned above, but are in contact with the return yoke layer 150 on the flat surface γ in the remaining areas β where the magnetic gap layer 130 is absent. Therefore, the pair of side shield layers 200 are magnetically connected to the return yoke layer 150, and function as a magnetic layer integrated with the return yoke layer 150. Consequently, a force by which the side magnetic fluxes leaking from both side faces 110A2 in the track width direction of the main magnetic pole layer 110 are absorbed by the pair of side shield layers 200 from both end faces 200A2 becomes greater than that in the case where the pair of side shield layers 200 are completely separated from the return yoke layer 150 (the case where the magnetic gap layer 130 is formed in the whole area in the track width direction). As a result, the side magnetic fluxes leaking from both side faces 110A2 of the main magnetic pole layer 110 so as to reach the recording medium M are reduced, whereby a side fringing suppressing effect sufficient for achieving a narrower track is obtained.

The amount of recording magnetic fluxes absorbed from the main magnetic pole layer 110 by the pair of side shield layers 200 (or the difficulty for the pair of side shield layers 200 to absorb the recording magnetic fluxes) can be adjusted by the gap width Wg of the magnetic gap layer 130. As the gap width Wg is made greater, the magnetic path length Wg/2 by which recording magnetic fluxes emitted from the trailing edge TE of the main magnetic pole layer 110 reach the pair of side shield layers 200 increases, whereby the recording magnetic fluxes are harder to be absorbed by the pair of side shield layers 200. As the gap width Wg is made smaller, on the other hand, the magnetic path length Wg/2 by which the recording magnetic fluxes emitted from the trailing edge TE of the main magnetic pole layer 110 reach the pair of side shield layers 200 decreases, whereby the recording magnetic fluxes are easier to be absorbed by the pair of side shield layers 200. Appropriately adjusting the gap width Wg can yield the side fringing suppressing effect, while keeping the recording magnetic field intensity from decreasing.

With reference to FIG. 4, steps of manufacturing the pair of side shield layers 200, magnetic gap layer 130, and return yoke layer 150 will be explained. (a) to (e) of FIG. 4 are sectional views showing respective steps of manufacturing the perpendicular magnetic recording head H1 as seen from the medium-opposing surface F side.

First, as shown in (a) of FIG. 4, the first nonmagnetic material layer 111 is totally formed on the coil insulating layer 109 and main magnetic pole layer 110 so as to cover both side faces 110A2 in the track width direction of the main magnetic pole layer 110 and the upper face (trailing edge TE) thereof. Here, the first nonmagnetic material layer 111 is formed by a thickness d1 defining the gap by which the main magnetic pole layer 110 opposes the pair of side shield layers 200. The thickness d1 is preferably about 30 to 50 nm in order to make it easy for the pair of side shield layers 200 to absorb side magnetic fluxes leaking from the main magnetic pole layer 110.

Next, as shown in (b) of FIG. 4, a shield layer 200' is formed on the first nonmagnetic material layer 111 by a thickness completely burying the nonmagnetic material layer 111 and main magnetic pole layer 110. Here, the shield layer 200' is formed totally in the track width direction but from the magnetic pole part 110A to the $1^{st}$ flare part 110B of the main magnetic pole layer 110 in the height direction.

Subsequently, the second nonmagnetic material layer 112 is formed on the shield layer 200' and first nonmagnetic material layer 111 so as to bury the surroundings of the main magnetic pole layer 110, and then subjected to chemical mechanical polishing (CMP) from the upper side, so as to expose the upper face (trailing edge TE) of the main magnetic pole layer 110. As a result of the polishing, the shield layer 200' becomes a pair of side shield layers 200 positioned on both sides in the track width direction of the main magnetic pole layer 110 while interposing the nonmagnetic material layer 111 as shown in (c) of FIG. 4. The upper face (trailing edge TE) of the main magnetic pole layer 110, the upper face of the first nonmagnetic material layer 111, and the upper faces of the pair of side shield layers 200 construct a continuous flat surface γ. Though not shown in (c) of FIG. 4, the second nonmagnetic material layer 112 fills the rear side in the height direction of the main magnetic pole layer 110.

After the polishing, the magnetic gap layer 130 is formed on the flat surface γ so as to be positioned in a partial area a in the track width direction bridging the main magnetic pole layer 110 and the pair of side shield layers 200 as shown in (d) of FIG. 4. Here, the magnetic gap layer 130 is formed by the gap width Wg yielding a desirable recording magnetic field intensity and side fringing suppressing effect and by the thickness Tg defining the magnetic gap distance between the main magnetic pole layer 110 and return yoke layer 150 on the medium-opposing surface F.

After forming the magnetic gap layer 130, the height determining layer 115, coil insulating foundation layer 117, second coil layer 118, and coil insulating layer 119 to be provided on the deeper side of the medium-opposing surface F in the height direction are formed.

Then, as shown in (e) of FIG. 4, the return yoke layer 150 is formed on the pair of side shield layers 200 and the magnetic gap layer 130. The return yoke layer 150 is separated from the pair of side shield layers 200 and main magnetic pole layer 110 in the partial area α where the magnetic gap layer 130 exists, but is in contact with the pair of side shield layers 200 in the remaining areas β where the magnetic gap layer 130 is absent. In the height direction, the return yoke layer 150 is formed from the magnetic gap layer 130 to the height determining layer 115 and coil insulating layer 119.

The foregoing steps yield the pair of side shield layers 200, magnetic gap layer 130, and return yoke layer 150 shown in FIG. 3.

By an undepicted driving means, the perpendicular magnetic recording head H1 is driven with a skew angle in a radial direction of the recording medium M (from its inner peripheral side to outer peripheral side or vice versa), so as to levitate in a state where the slider 101 is tilted with respect to the recording medium M (recording medium plane). The magnetic flux generated upon energization of the recording coil (first and second coil layers 108, 118) is transmitted from the auxiliary yoke layer 120 to the base part 110D of the main magnetic pole layer 110, narrowed through the $2^{nd}$ flare part 110C and $1^{st}$ flare part 110B from the base part 110D, and then released from the front end face 110A1 of the magnetic pole part 110A to the recording medium M. This applies a recording magnetic field Φ perpendicularly to the recording medium M, thereby recording magnetic information onto the recording medium M. During this recording action, side magnetic fluxes (leakage magnetic fields) spreading from both side faces 110A2 of the magnetic pole part 110A are absorbed by the pair of partial side shield layers 200, so that the side fringe width can be made narrower than that in the case without the pair of partial side shield layers 200, whereby problems such as recording fringing onto the recording medium M and erasing of recording information in adjacent recording tracks can be prevented from occurring. At the same time, the magnetic gap layer 130 makes it difficult for the pair of side shield layers 200 to absorb the recording magnetic flux (recording magnetic field Φ) directed from the magnetic pole part 110A to the recording medium M, so that the recording magnetic field intensity can be kept from decreasing even when the pair of side shield layers 200 are provided, whereby the recording magnetic field Φ sufficient for magnetic recording can be applied to the recording medium M. At the time of no skewing (with a skew angle of 0°), the side magnetic fluxes from both side faces 110A2 are reduced by the bevel form of the magnetic pole part 110A itself, whereby side fringing can be suppressed.

FIGS. 5 and 6 show a second embodiment of the present invention. FIG. 5 is a transverse sectional view showing the multilayer structure of a perpendicular magnetic recording head H2 as seen from the medium-opposing surface side. In the second embodiment, which is formed by manufacturing steps different from those of the first embodiment explained above, the pair of side shield layers 200 are shorter than the return yoke layer 150 in the track width direction and in contact with the return yoke layer 150 at both end faces 200A3 on the side opposite from both end faces 200A2 opposing both side faces 110A2 of the main magnetic pole layer 110.

The pair of side shield layers 200 have upper faces forming the flat surface γ continuous with the upper face (trailing edge TE) of the main magnetic pole layer 110 and the upper face of the first nonmagnetic material layer 111 at the same lamination position, and are separated from the return yoke layer 150 on the flat surface γ since the flat surface γ is totally covered with the magnetic gap layer 130. Both end faces 200A3 of the pair of side shield layers 200 in contact with the return yoke layer 150 form tilted surfaces continuous with both end faces 130A3 in the track width direction of the magnetic gap layer 130 and are positioned in the remaining areas β where the magnetic gap layer 130 is absent.

In the second embodiment, the magnetic gap layer 130 separates the pair of side shield layers 200 from the return yoke layer 150 in the vicinity of the main magnetic pole layer 110 (partial area α) as in the first embodiment, so that the recording magnetic flux directed from the main magnetic pole layer 110 to the recording medium M is hard to be absorbed by the pair of side shield layers 200, whereby the recording magnetic field intensity can be kept from decreasing. Since the pair of side shield layers 200 are in contact with the return yoke layer 150 at both end faces 200A3 separated from the main magnetic pole layer 110 in the track width direction, side magnetic fluxes leaking from both side faces 110A2 of the main magnetic pole layer 110 are easy to be absorbed by the pair of side shield layers 200, whereby a side fringing suppressing effect sufficient for achieving a narrower track can be obtained. Adjusting the gap width Wg of the magnetic gap layer 130 can increase or decrease the amount of recording magnetic fluxes absorbed from the main magnetic pole layer 110 by the pair of side shield layers 200 (or the difficulty for the pair of side shield layers 200 to absorb the recording magnetic fluxes), thereby yielding the side fringing suppressing effect, while keeping the recording magnetic field intensity from decreasing.

With reference to FIG. 6, steps of manufacturing the pair of side shield layers 200, magnetic gap layer 130, and return yoke layer 150 will be explained. (a) to (f) of FIG. 6 are sectional views showing respective steps of manufacturing the perpendicular magnetic recording head H2 as seen from the medium-opposing surface F side.

First, as shown in (a) of FIG. 6, the first nonmagnetic material layer 111 is totally formed on the coil insulating layer 109 and main magnetic pole layer 110 so as to cover both side faces 110A2 in the track width direction of the main magnetic pole layer 110 and the upper face (trailing edge TE) thereof. Here, the first nonmagnetic material layer 111 is formed by a thickness d1 defining the gap by which the main magnetic pole layer 110 opposes the pair of side shield layers 200. The thickness d1 is preferably about 30 to 50 nm in order to make it easy for the pair of side shield layers 200 to absorb side magnetic fluxes leaking from the main magnetic pole layer 110.

Next, as shown in (b) of FIG. 6, the shield layer 200' is formed on the first nonmagnetic material layer 111 by a thickness completely burying the nonmagnetic material layer 111 and main magnetic pole layer 110. Here, the shield layer 200' is formed totally in the track width direction but from the magnetic pole part 110A to the $1^{st}$ flare part 110B of the main magnetic pole layer 110 in the height direction, Subsequently, the second nonmagnetic material layer 112 is formed on the shield layer 200' and first nonmagnetic material layer 111 so as to bury the surroundings of the main magnetic pole layer 110, and then subjected to chemical mechanical polishing (CMP) from the upper side, so as to expose the upper face (trailing edge TE) of the main magnetic pole layer 110. As a result of the polishing, the shield layer 200' becomes a pair of side shield layers 200 positioned on both sides in the track width direction of the main magnetic pole layer 110 while interposing the nonmagnetic material layer 111 as shown in (c) of FIG. 6. The upper face (trailing edge TE) of the main magnetic pole layer 110, the upper face of the first nonmagnetic material layer 111, and the upper faces of the pair of side shield layers 200 construct a flat surface γ. Though not shown in (c) of FIG. 6, the second nonmagnetic material layer 112 fills the rear side in the height direction of the main magnetic pole layer 110.

The foregoing steps are the same as those of the first embodiment shown in (a) to (c) of FIG. 4.

After the polishing, the magnetic gap layer 130 is totally formed on the flat surface γ as shown in (d) of FIG. 6. Here, the magnetic gap layer 130 is formed by the thickness Tg defining the magnetic gap distance between the main magnetic pole layer 110 and return yoke layer 150 on the medium-opposing surface F.

Subsequently, as shown in (e) of FIG. 6, the magnetic gap layer 130 and the pair of side shield layers 200 are removed by etching except for a partial area α in the track width direction bridging the main magnetic pole layer 110 and the pair of side shield layers 200, while leaving the magnetic gap layer 130 by a desirable gap width Wg in the partial area α. As a consequence, both end faces 130A3 of the magnetic gap layer 130 and both end faces 203A3 of the pair of side shield layers 200 form continuous tilted surfaces, so that both end faces 203A3 of the pair of side shield layers 200 are positioned in the remaining areas β where the magnetic gap layer 130 is absent. The first nonmagnetic material layer 111 is exposed at the part from which the magnetic gap layer 130 and pair of side shield layers 200 are removed.

After forming the magnetic gap layer 130, the height determining layer 115, coil insulating foundation layer 117, second coil layer 118, and coil insulating layer 119 to be provided on the deeper side of the medium-opposing surface F in the height direction are formed.

Subsequently, as shown in (f) of FIG. 6, the return yoke layer 150 is formed so as to cover the exposed part of first nonmagnetic material layer 111, both end faces 200A3 of the pair of side shield layers 200, and the upper face and both end faces 130A of the magnetic gap layer 130. The return yoke layer 150 is separated from the pair of side shield layers 200 and main magnetic pole layer 110 in the partial area a where the magnetic gap layer 130 exists, but is in contact with both end faces 200A3 of the pair of side shield layers 200 in the remaining areas β where the magnetic gap layer 130 is absent. In the height direction, the return yoke layer 150 is formed from the magnetic gap layer 130 to the height determining layer 115 and coil insulating layer 119.

The foregoing steps yield the pair of side shield layers 200, magnetic gap layer 130, and return yoke layer 150 shown in FIG. 5. In the second embodiment, the part of side shield layers 200 positioned directly below the part of magnetic gap layer 130 outside of the gap width Wg is removed together with the latter in the etching step for defining the gap width Wg of the magnetic gap layer 130, whereby the size of the pair of side shield layers 200 in the track width direction is determined according to the gap width Wg.

FIGS. 7 and 8 show a third embodiment of the present invention. FIG. 7 is a transverse sectional view showing the multilayer structure of a perpendicular magnetic recording head H3 as seen from the medium-opposing surface side. The third embodiment is a modified example of the above-mentioned first embodiment in which an auxiliary magnetic gap layer 140 interposed between the return yoke layer 150 and a pair of side shield layers 200 is provided in the remaining areas where the magnetic gap layer 130 is absent.

The auxiliary magnetic gap layer 140 is made of a nonmagnetic material such as $Al_2O_3$ or $SiO_2$, for example, and formed on the pair of side shield layers 200 and the first nonmagnetic material layer 111. The auxiliary magnetic gap layer 140 is laminated under the magnetic gap layer 130 in a partial area a where the magnetic gap layer 130 exists, but is in contact with both side faces 110A2 in the track width direction of the main magnetic pole layer 110 on the trailing edge TE side thereof. In the remaining areas P where the magnetic gap layer 130 is absent, the auxiliary magnetic gap layer 140 is interposed between the return yoke layer 150 and the pair of side shield layers 200 as mentioned above. The upper face of the auxiliary magnetic gap layer 140 is made flat such as to be continuous with the upper face of the main magnetic pole layer 110 at the same lamination position. The upper faces of the pair of side shield layers 200 and the upper face of the first nonmagnetic material layer 111 are made flush with each other on the lower side in the drawing than the upper face (trailing edge TE) of the main magnetic pole layer 110.

The auxiliary magnetic gap layer 140 has such a thickness d2 as to generate a magnetic connection between the return yoke layer 150 and the pair of side shield layers 200. Here, the magnetic connection refers to a state where a leakage magnetic flux occurs between the return yoke layer 150 and the pair of side shield layers 200 through a connection weaker than a direct connection between the return yoke layer 150 and the pair of side shield layers 200. Specifically, it will be desirable if the thickness d2 of the auxiliary magnetic gap layer 140 is about 30 to 50 nm. The magnetic gap distance is defined by the thickness Tg in the third embodiment as well.

Since the pair of side shield layers 200 are separated from the return yoke layer 150 by the magnetic gap layer 130 and auxiliary magnetic gap layer 140 in the vicinity of the main magnetic pole layer 110 (partial area α), recording magnetic fluxes directed from the main magnetic pole layer 110 to the recording medium M are hard to be absorbed by the pair of side shield layers 200, whereby the recording magnetic field intensity can be kept from decreasing in the third embodiment as in the first embodiment. The pair of side shield layers 200 are in contact with the return yoke layer 150 through the auxiliary magnetic gap layer 140 in the remaining areas β where the magnetic gap layer 130 is absent, and thus function as a magnetic layer integrated with the return yoke layer 150. This makes it easy for the pair of side shield layers 200 to absorb side magnetic fluxes leaking from both side faces 110A2 of the main magnetic pole layer 110, whereby a side fringing suppressing effect sufficient for achieving a narrower track can be obtained. Adjusting the gap width Wg of the magnetic gap layer 130 can increase or decrease the amount of recording magnetic fluxes absorbed from the main magnetic pole layer 110 by the pair of side shield layers 200 (or the difficulty for the pair of side shield layers 200 to absorb the recording magnetic fluxes), thereby yielding the side fringing suppressing effect, while keeping the recording magnetic field intensity from decreasing.

In the third embodiment, the pair of side shield layers 200 have the upper faces located on the lower side in the drawing than the trailing edge TE of the main magnetic pole layer 110, and thus are harder to be involved with recording magnetic fluxes emitted from the trailing edge TE of the main magnetic pole layer 110. Locating the pair of side shield layers 200 more on the leading edge side of the main magnetic pole layer 110 as such can also keep the recording magnetic field intensity from decreasing. At the time of skewing, the slider 101 is tilted, whereby the side fringing can be suppressed by reducing the side magnetic fluxes occurring from the leading edge LE side of both side faces 110A2 of the magnetic pole part 110A even when the side magnetic fluxes occurring from both side faces 110A2 are not completely eliminated.

With reference to FIG. 8, steps of manufacturing the pair of side shield layers 200, magnetic gap layer 130, auxiliary magnetic gap layer 140, and return yoke layer 150 will be explained. (a) to (g) of FIG. 8 are sectional views showing respective steps of manufacturing the perpendicular magnetic recording head H3 as seen from the medium-opposing surface F side.

First, as shown in (a) of FIG. 8, the first nonmagnetic material layer 111 is totally formed on the coil insulating layer 109 and main magnetic pole layer 110 so as to cover both side faces 110A2 in the track width direction of the main magnetic pole layer 110 and the upper face (trailing edge TE) thereof. Here, the first nonmagnetic material layer 111 is formed by a thickness d1 defining the gap by which the main magnetic pole layer 110 opposes the pair of side shield layers 200. The thickness d1 is preferably about 30 to 50 nm in order to make it easy for the pair of side shield layers 200 to absorb side magnetic fluxes leaking from the main magnetic pole layer 110.

Next, as shown in (b) of FIG. 8, the shield layer 200' is formed on the first nonmagnetic material layer 111 by a thickness completely burying the nonmagnetic material layer 111 and main magnetic pole layer 110. Here, the shield layer 200' is formed totally in the track width direction but from the magnetic pole part 110A to the $1^{st}$ flare part 110B of the main magnetic pole layer 110 in the height direction.

Subsequently, the second nonmagnetic material layer 112 is formed on the shield layer 200' and first nonmagnetic material layer 111 so as to bury the surroundings of the main magnetic pole layer 110, and then subjected to chemical mechanical polishing (CMP) from the upper side of the second nonmagnetic material layer 112, so as to expose the upper face (trailing edge TE) of the main magnetic pole layer 110. As a result of the polishing, the shield layer 200' becomes a pair of side shield layers 200 positioned on both sides in the track width direction of the main magnetic pole layer 110 while interposing the nonmagnetic material layer 111 as shown in (c) of FIG. 8. The upper face (trailing edge TE) of the main magnetic pole layer 110, the upper face of the first nonmagnetic material layer 111, and the upper faces of the pair of side shield layers 200 construct a flat surface γ. Though not shown in (c) of FIG. 8, the second nonmagnetic material layer 112 fills the rear side in the height direction of the main magnetic pole layer 110.

The foregoing steps are the same as those of the first embodiment shown in (a) to (c) of FIG. 4.

Next, as shown in (d) of FIG. 8, the pair of side shield layers 200 and the first nonmagnetic material layer 111 are partly thinned in the thickness direction by etching, for example, so that the upper faces of the pair of side shield layers 200 and the upper face of the first nonmagnetic material layer 111 are made flush with each other on the lower side in the drawing than the upper face of the main magnetic pole layer 110. Here, the thickness by which the pair of side shield layers 200 and the first nonmagnetic material layer 111 are removed corresponds to the thickness d2 of the auxiliary magnetic gap layer to be formed in the subsequent step.

Subsequently, as shown in (e) of FIG. 8, the auxiliary magnetic gap layer 140 is formed on the pair of side shield layers 200 and the first nonmagnetic material layer 111 so as to come into contact with both side faces 110A2 in the track width direction of the main magnetic pole layer 110 and become flush with the upper face of the main magnetic pole layer 110.

Next, as shown in (f) of FIG. 8, the magnetic gap layer 130 is formed on the auxiliary magnetic gap layer 140 and the main magnetic pole layer 110 such as to be positioned in the partial area α in the track width direction bridging the main magnetic pole layer 110 and the pair of side shield layers 200.

Here, the magnetic gap layer 130 is formed by the gap width Wg yielding a desirable recording magnetic field intensity and side fringing suppressing effect and by the thickness Tg defining the magnetic gap distance.

After forming the magnetic gap layer 130, the height determining layer 115, coil insulating foundation layer 117, second coil layer 118, and coil insulating layer 119 to be provided on the deeper side of the medium-opposing surface F in the height direction are formed.

Then, as shown in (g) of FIG. 8, the return yoke layer 150 is formed on the pair of side shield layers 200 and the magnetic gap layer 130. The return yoke layer 150 is separated from the pair of side shield layers 200 and main magnetic pole layer 110 in the partial area α where the magnetic gap layer 130 exists, but is in contact with the pair of side shield layers 200 in the remaining areas β where the magnetic gap layer 130 is absent. In the height direction, the return yoke layer 150 is formed from the magnetic gap layer 130 to the height determining layer 115 and coil insulating layer 119.

The foregoing steps yield the pair of side shield layers 200, magnetic gap layer 130, and return yoke layer 150 shown in FIG. 7.

Though the foregoing explains the embodiments adjusting the gap width Wg of the magnetic gap layer 130, so as to increase or decrease the amount of recording magnetic fluxes absorbed by the pair of side shield layers 200, thereby securing a desirable recording magnetic field intensity and side fringing suppressing effect, the thickness Tg of the magnetic gap layer 130 may be adjusted so as to increase or decrease the amount of recording magnetic fluxes absorbed by the pair of side shield layers 200. However, since the thickness of the magnetic gap layer 130 is very small, i.e., 30 to 50 nm, adjusting the gap width Wg of the magnetic pole layer 130 as in this embodiment is easier.

It is apparent that various embodiments and modifications of the present invention can be embodied, based on the above description. Accordingly, it is possible to carry out the present invention in the other modes than the above best mode, within the following scope of claims and the scope of equivalents.

What is claimed is:
1. A perpendicular magnetic recording head comprising a main magnetic pole layer and a return yoke layer, the main magnetic pole layer and return yoke layer being laminated with a predetermined distance therebetween on a surface opposing a recording medium and magnetically coupled to each other on a deeper side opposite the medium-opposing surface in a height direction, a magnetic gap layer interposed between the main magnetic pole layer and the return yoke layer on the medium-opposing surface side, and a pair of side shield layers positioned on both sides in a track width direction of the main magnetic pole layer while interposing a nonmagnetic material layer therebetween;

wherein the magnetic gap layer is formed in a partial area in the track width direction bridging the main magnetic pole layer and the pair of side shield layers, the pair of side shield layers being in contact with the return yoke layer in a remaining area where the magnetic gap layer is absent, each of end faces of the magnetic gap layer along the medium-opposing surface is formed by a tilted surface, and the pair of side shield layers have a flat surface constituting the same plane with a trailing edge of the main magnetic pole layer and are in contact with the return yoke layer in an area of the flat surface where the magnetic gap layer is absent.

2. A perpendicular magnetic recording head according to claim 1, wherein a cross-sectional form of the magnetic gap layer as seen from the medium-opposing surface is a trapezoidal form symmetrical about a center position in the track width direction of the main magnetic pole layer.

3. A perpendicular magnetic recording head comprising a main magnetic pole layer and a return yoke layer, the main magnetic pole layer and return yoke layer being laminated with a predetermined distance therebetween on a surface opposing a recording medium and magnetically coupled to each other on a deeper side opposite the medium-opposing surface in a height direction, a magnetic gap layer interposed between the main magnetic pole layer and the return yoke layer on the medium-opposing surface side, and a pair of side shield layers positioned on both sides in a track width direction of the main magnetic pole layer while interposing a nonmagnetic material layer therebetween;

wherein the magnetic gap layer is formed in a partial area in the track width direction bridging the main magnetic pole layer and the pair of side shield layers, the pair of side shield layers being in contact with the return yoke layer in a remaining area where the magnetic gap layer is absent, each of end faces of the magnetic gap layer is formed by a tilted surface, and the pair of side shield layers have a flat surface constituting the same plane with a trailing edge of the main magnetic pole layer, the flat surface being laminated with the magnetic gap layer, and end faces in the track width direction respectively continuous with both side faces in the track width direction of the magnetic gap layer, the pair of side shield layers being in contact with the return yoke layer at both of the end faces in the track width direction.

\* \* \* \* \*